United States Patent
Carr et al.

(10) Patent No.: US 8,015,884 B1
(45) Date of Patent: Sep. 13, 2011

(54) METHOD AND MEANS OF MEASURING THE FLOW RATE OF PARTICULATE MATTER

(75) Inventors: Brian W. Carr, Nevada, IA (US); Scott A. Sporrer, Nevada, IA (US); Curtis R. Hammer, Nevada, IA (US); Scott P. Lyle, Urbandale, IA (US); Cory W. Fees, Urbandale, IA (US); Adam R. Koesters, Ames, IA (US)

(73) Assignee: Gary W. Clem, Inc., Nevada, IA (US)

( * ) Notice: Subject to any disclaimer, the term of this patent is extended or adjusted under 35 U.S.C. 154(b) by 0 days.

(21) Appl. No.: 12/969,182

(22) Filed: Dec. 15, 2010

(51) Int. Cl.
*G01F 1/30* (2006.01)
(52) U.S. Cl. .................................................. 73/861.73
(58) Field of Classification Search ............... 73/861.72, 73/861.73, 861.74
See application file for complete search history.

(56) References Cited

U.S. PATENT DOCUMENTS

| | | | |
|---|---|---|---|
| 5,129,266 A | 7/1992 | Brandt, Jr. | |
| 5,165,290 A | 11/1992 | Brandt, Jr. | |
| 5,219,031 A | 6/1993 | Brandt, Jr. | |
| 5,230,251 A | 7/1993 | Brandt, Jr. | |
| 5,895,865 A * | 4/1999 | Ozawa | 73/861.73 |
| 6,147,503 A | 11/2000 | Nelson et al. | |
| 6,471,032 B2 * | 10/2002 | Busschaert et al. | 198/312 |
| 6,679,125 B1 | 1/2004 | Brandt, Jr. | |
| 6,805,014 B1 | 10/2004 | Shyy et al. | |
| 6,951,141 B2 * | 10/2005 | Yata | 73/861.73 |
| 6,973,843 B2 | 12/2005 | Shyy et al. | |

* cited by examiner

*Primary Examiner* — Jewel V Thompson

(57) ABSTRACT

A flow meter used in relation to a hopper mounted to a frame and a transfer tube connected to an in communication with the hopper. Both the hopper and the transfer tube have gates that are connected to actuators for selectively opening and closing the gates. A sensor is mounted to the frame adjacent the transfer tube. Mounted below and in communication with the transfer tube is the flow meter. The flow meter has a curved chute and a load beam that measure the inertial force of material acting upon the curved chute over time.

5 Claims, 2 Drawing Sheets

METHOD AND MEANS OF MEASURING THE FLOW RATE OF PARTICULATE MATTER

BACKGROUND OF THE INVENTION

This invention is directed to a method and means of measuring the flow rate and weight of particulate matter and more particularly to a method and means of measuring weight based upon the flow rate of the matter.

Monitoring and managing material flow is known in the art. Various methods have been employed that involve the use of load cells attached to shelves or baffles. While helpful in measuring flow, these devices are not as accurate as desired, are not as fast as desired, are heavy, and require many moving parts. Therefore, a need exists in the art for a method and means of measuring flow that address these deficiencies.

An objective of the present invention is to provide a flow meter/weighing device that is more accurate.

Another objective of the present invention is to provide a flow meter/weighing device that is lighter in weight and made of fewer parts.

These and other objectives will be apparent to one of ordinary skill in the art based upon the following written description, drawings, and claims.

BRIEF SUMMARY OF THE INVENTION

A flow meter used in relation to a hopper mounted to a frame and a transfer tube connected to and in communication with the hopper. Both the hopper and the transfer tube have gates that are connected to actuators for selectively opening and closing the gates. A sensor is mounted to the frame adjacent the transfer tube. Connected to and in communication with the transfer tube is the flow meter. The flow meter has a curved chute and a load beam that measure the centrifugal force of material acting upon the curved chute over time.

DETAILED DESCRIPTION OF THE PREFERRED EMBODIMENT

Figure 1:
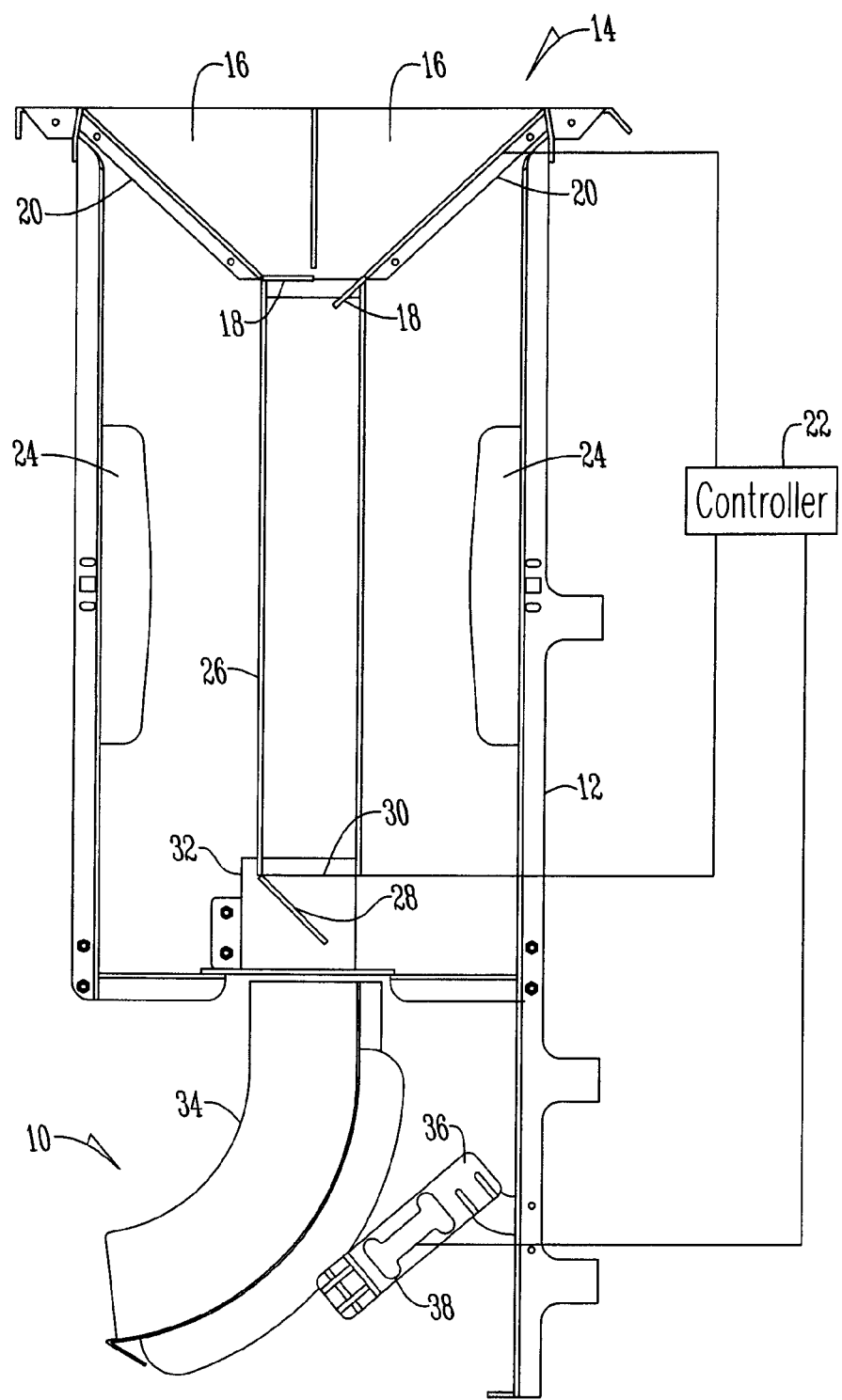
FIG. 1 is a side view of a flow meter assembly.
Figure 2:
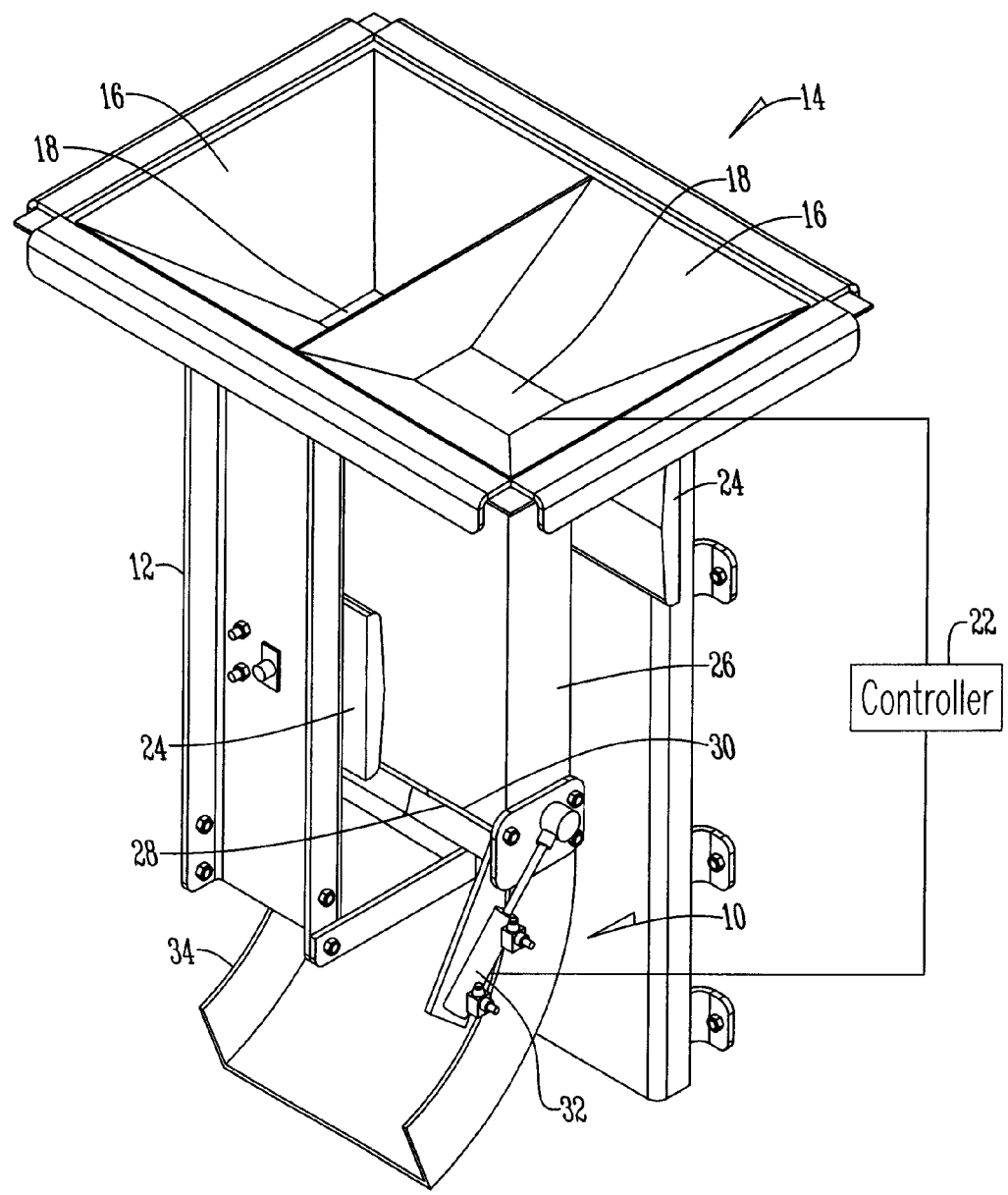
FIG. 2 is a perspective view of a flow meter assembly.

Referring to the Figures, a flow meter 10 is used in relation to a frame 12 upon which a hopper 14 is mounted. Preferably, the hopper 14 has multiple compartments 16 so that different samples may be harvested from different plots. Located at the bottom of each compartment 16 is a pivotal door or gate 18. The gate 18 is operatively connected to a first actuator 20 that is mounted on the frame 12. The first actuator is connected to a controller 22.

Attached to the frame 12 is a sensor 24 for determining the moisture content and density of particulate matter. While any type of sensor 24 is used, preferred is one using radio-frequency permittivity measurements such as disclosed in U.S. Pat. No. 6,147,503 by Nelson et al. hereby incorporated by reference in its entirety. The sensor 24 is connected to the controller 22.

Connected to and in communication with the hopper 14 is a transfer tube 26. The sensor 24 is positioned adjacent to the transfer tube 26. The transfer tube 26 has a door or gate 28 pivotally mounted to tube 26 or frame 12 to close the discharge end 30 of tube 26. The gate 28 is operatively connected to a second actuator 32 that is mounted on the frame. The second actuator 32 is connected to the controller 22.

The flow meter 10 is connected to and in communication with the transfer tube 26. The flow meter 10 includes a curved chute 34 positioned below the transfer tube 26 such that the tangent minimizes the impact of falling matter on the chute. Preferably, the chute 34 is positioned so that matter contacts the chute at a high point on the chute 34 to change direction of the matter.

Connected to the chute 34 by a bracket 36 is a load beam 38. The bracket 36 is connected to the chute 34 at one end and to the frame 12 at the other end. The load beam 38 is connected to the bracket 36 and to the controller 22 to measure the inertial force of falling matter against the chute 34 over a period of time.

In operation, matter such as seeds, are placed in the compartments 16 of the hopper 14. The first gate 18 is opened by the first actuator 20 which is activated by a signal from the controller 22. As seed falls through the transfer tube 26, the sensor 24 detects information that is transmitted to the controller 22 in order to determine the moisture content and density of the seeds, as well as whether the flow of the seeds has become steady.

When the transfer tube is filled, the controller 22 sends a signal to the second actuator 32 which activates gate 28 to pivot to an open position. Once open, seed falls from the transfer tube 26 onto sloped chute 34 and then is discharged such that no seed dwells on the end of the chute 34. The load beam 38 detects the inertial force of the seed acting upon the chute 34 and transmits the detected information to the controller. The controller then calculates the mass based on a summed value of the force for a timed unit. In calculating the mass, the mass is corrected based upon the flow rate of the seed.

Accordingly, a flow meter has been discharged that at the very least meets all the stated objectives.

What is claimed is:

1. A flow meter assembly, comprising:
   a hopper mounted to a frame, the hopper having a pivotally mounted gate;
   a transfer tube connected to and in communication with the hopper;
   a sensor mounted to the frame adjacent the transfer tube for measuring a property of the material flowing through the transfer tube; and
   a flow meter having a curved chute and a load beam that measure the weight of material as adjusted based upon the flow rate of the material.

2. The flow meter assembly of claim 1 wherein the property of the material is selected from the group consisting of moisture content, weight and density of the material flowing through the transfer tube.

3. A method of measuring the flow of material, comprising the steps of:
   depositing material in a hopper;
   releasing the material from the hopper to a transfer tube;
   determining a property of the material while held in the transfer tube;
   releasing the material from the transfer tube to a flow meter having a curved chute;
   determining the flow rate of the material based upon the inertial force of the material acting upon the curved chute;
   calculating the weight of the material by integrating the flow rate over the time that the material is flowing; and
   adjusting the calculated weight of the material based upon the flow rate of the material.

4. The method of claim 3 wherein the property of the material is selected from the group consisting of moisture content, weight and density of the material in the transfer tube.

5. The flow meter assembly of claim 1 wherein the transfer tube has a pivotally mounted gate.

* * * * *